United States Patent [19]
Cunard et al.

[11] 4,447,093
[45] May 8, 1984

[54] WHEEL

[75] Inventors: Joel C. Cunard; William H. Ziegler, Jr., both of Bedford, Pa.

[73] Assignee: Brown Group Recreational Products, Inc., Bedford, Pa.

[21] Appl. No.: 406,579

[22] Filed: Aug. 9, 1982

Related U.S. Application Data

[62] Division of Ser. No. 227,158, Jan. 22, 1981, Pat. No. 4,387,070.

[51] Int. Cl.³ .......................... B60B 1/06; B29D 3/00
[52] U.S. Cl. ............................. 301/63 PW; 152/323; 152/385
[58] Field of Search ............... 152/151, 246, 323, 326, 152/378 R, 379.3, 380, 385, 388; 301/63 PW; 16/45; 264/249, 262, 274

[56] References Cited

U.S. PATENT DOCUMENTS 3,578,812  5/1971  Taussig et al. ............... 301/63 PW
4,153,303  5/1979  Tanner ........................... 152/323 X Primary Examiner—William A. Powell
Assistant Examiner—Thomas Bokan
Attorney, Agent or Firm—Casari and McKenna

[57] ABSTRACT

A wheel is composed of a rigid plastic inner section forming the wheel hub and rim and a resilient plastic tire section encircling the rim. A key formed integrally with the rim extends radially outward therefrom and interlockingly projects into the tire so as to mechanically connect the tire to the rim all around the wheel. The key can be formed with axially extending portions spaced radially outboard of the rim and terminating flush with the outer surface of the tire section so as to provide colored side wall decorations at one or both sides of the wheel.

13 Claims, 3 Drawing Figures 4,447,093

WHEEL

RELATED APPLICATION

This application is a Division of application Ser. No. 227,158, filed Jan. 22, 1981, now U.S. Pat. No. 4,387,070.

This invention relates to a wheel for use particularly on juvenile furniture. It relates more particularly to an improved molded plastic wheel.

BACKGROUND OF THE INVENTION

Articles of juvenile furniture such as strollers, carriages, baby walkers and the like are customarily provided with wheels whose rims and hubs are made of metal or rigid plastic. A solid rubber tire encircles the rim so that the wheel as a whole has some "give" or resilience as it rolls over the ground. A metal rim wheel such as this is relatively expensive to make because the rim must be connected in some fashion to the wheel hub. This is most commonly accomplished by means of spokes or radial ribs. In another equally expensive wheel construction of which we are aware, the wheel is composed of two circular shells each defining one-half of the rim and one-half of the hub. The two shells are secured together edge to edge to form the wheel. In both of these constructions, the tire must then be mounted on the rim to form the finished wheel.

Molded plastic wheels are also quite commonplace. In this type of wheel, the hub, spokes and rim are all molded as one piece and the periphery of the wheel is embossed to simulate a tire. The use of this type of wheel is generally confined to very inexpensive strollers doll carriages and the like because the wheel is not at all resilient and therefore gives a bumpy ride. Also, being a unitary molded plastic part, the entire wheel including the simulated tire is composed of the same colored plastic material. Therefore, the prospective purchaser of the stroller or carriage perceives that wheel to be inferior to one that carries a discernible resilient tire.

In addition, from a marketing standpoint, it would be desirable to provide a wheel for strollers and carriages which can be provided with a decorative side stripe similar to the sidewall stripe on an automobile tire. Until now, the only way this could be done is by painting the circular stripe on the sides of the wheel tire just outboard of the rim. However, such an operation adds appreciably to the overall cost of the wheel. Furthermore, in normal use of the vehicle, the wheel stripes become scraped and worn so that they no longer present an attractive appearance.

SUMMARY OF THE INVENTION

Accordingly, it is an object of the present invention to provide an improved wheel for use particularly on strollers, carriages and other similar items.

Another object of the invention is to provide a wheel such as this which is made entirely of plastic.

A further object is to provide such a wheel which is formed so that it has a clearly discernible resilient peripheral tire.

Yet another object of the invention is to provide a plastic wheel with integral decorative side wall stripes.

A further object of the invention is to provide a plastic wheel such as this which is relatively easy and inexpensive to make.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present wheel is formed entirely of plastic. It comprises an integrally formed spoked discoid rim and hub section molded of rigid plastic material in a first molding step. Then in a second molding step, a tire section is molded directly onto the rim section. The tire section material is a resilient plastic which is preferably colored black just like a conventional rubber tire.

During the second molding step, the wheel rim actually forms a part of the tire mold and the rim is provided with a peripheral key so that when the plastic tire material sets, that material interlocks with the key with the result that the tire is positively mechanically connected to the rim all around the circumference of the wheel.

In a preferred embodiment of the invention, the rim section of the wheel is also formed with flanges spaced outboard of the wheel rim and inboard of the key. The flanges are more or less parallel to the rim and may be present at one or both sides of the wheel. The lateral extent of those flanges is such that when the rim section is placed in the tire mold in preparation for the tire molding step, the edges of those flanges engage the sides of the tire mold.

When the plastic tire material is injected into the mold, it is free to flow all around those flanges on opposite sides thereof but not around the edges of the flanges. Resultantly, when the wheel is removed from the tire mold, the flange edges which engaged the tire mold lie flush with the tire surfaces at the sides of the tire.

Thus, assuming that the wheel rim and tire sections are made of different colored plastic materials, the flange edges appear as distinct circular stripes at the sides of the tire resembling the sidewall stripes found on conventional automobile tires. Furthermore, these stripes are built right into the wheel so that they cannot be scraped or abraded away.

Using the present technique, then, one can fabricate a wheel which is made entirely of plastic. Yet the rim and tire sections can be composed of plastic materials which have different colors and physical characteristics. Accordingly, the resultant plastic wheel looks and functions just like a conventional rubber tire wheel. By appropriately designing the wheel rim section as will be discussed in more detail later, one can obtain a variety of decorative effects on the wheel. These include single and multiple side wall stripes which may be continuous, interrupted or a combination of both. Yet with all of these advantages, the cost of making the subject wheel is less than that of prior conventional wheels having discernible resilient tires.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
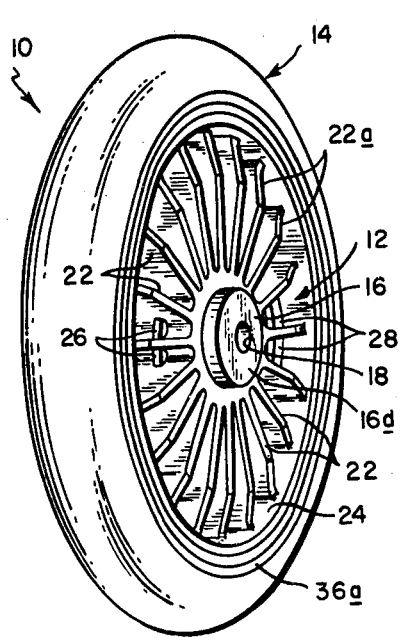
FIG. 1 is a front perspective view of a wheel made in accordance with this invention.
Figure 2:
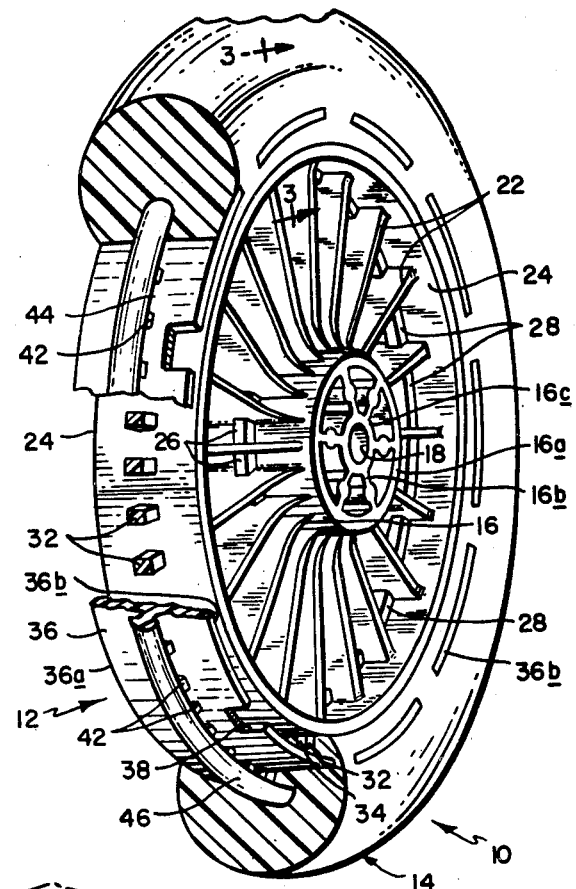
FIG. 2 is a rear perspective view of the wheel on a larger scale with parts broken away.

Referring to FIGS. 1 and 2 of the drawings, the wheel indicated generally at 10 comprises a discoid molded plastic rim section indicated generally at 12 and a molded generally toroidal plastic tire section shown generally at 14 mechanically connected to section 12. The rim section 12 which is composed of a rugged, impact-resistant plastic such as polypropylene or high-density polyethylene is formed wth a generally cylindrical hub 16. As best seen in FIG. 2, the hub includes a cylindrical outer wall 16a. Extending radially inward from wall 16a is a circumferential array of tabs or fins 16b which terminate at their inner ends at a cylindrical inner wall 16c. As shown in FIG. 1, an annular end wall 16d bridges the ends of the walls 16a and 16c to provide a finished appearance at the front of the wheel. The bore or passage 18 through wall 16c is arranged to rotatively receive the wheel axle when the wheel is mounted to a stroller or other juvenile furniture item.

Extending radially outward from hub 16 to a circular array of flat spokes 22. Spokes 22 terminate at their outer ends at a circular rim 24. At their outer ends, the spoke edges 22 at the finished front of the wheel are beveled inwardly as indicated at 22a in FIGS. 1 and 3 chiefly for ornamental reasons. As interrupted radial flange 26 projects out from hub wall 16a between the spokes 22 to rigidify the wheel. A second interrupted flange 28 projects radially inward from rim 24 for the same reason.

Figure 3:
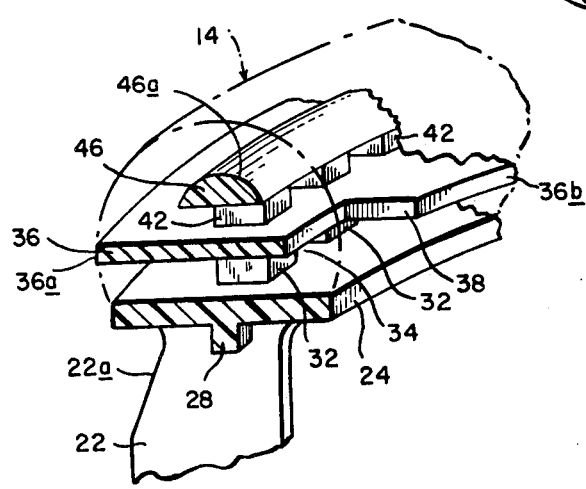
FIG. 3 is a sectional view along line 3—3 of FIG. 2 on a still larger scale showing parts of the wheel in greater detail.

Referring now to FIGS. 2 and 3, projecting radially out from the outer surface of rim 24 in a circular array of circumferentially spaced apart pedestals 32, each pedestal being separated from its neighbor by a gap 34. In the illustrated wheel, the outer ends of these pedestals 32 terminate in a flat circular ring 36 which is concentric with rim 24.

Projecting radially outward from the outer surface of ring 36 is a circular array of pedestals 42 which are separated by gaps 44. Pedestals 42 are essentially extensions of pedestals 32. The outer ends of pedestals 42 all terminate at a bead 46 which encircles ring 36. Bead 46 overhangs the sidewalls of pedestals 42 and its radially outer surface 46a is rounded. Thus the pedestals 42 and the bead 46 form an annular key radially outboard of the ring 36.

The wheel tire section 14 is molded directly onto the periphery of the wheel section as shown in FIGS. 2 and 3. Furthermore, the tire section is a solid mass of resilient plastic material such as thermoplastic polyurethane elastomer (65 Shore A durometer). It could just as well be a polyvinyl chloride elastomer. This material flows around and between the pedestals 32 and 42 and under the ring 36 and bead 46 so that all of these elements interlock with the tire section during its formation. Consequently, when the tire section material cures or sets, it is firmly mechanically anchored and interlocked with those components of the wheel section. Therefore, there is essentially no possibility of the tire section becoming separated from the rim section even after prolonged usage of the wheel.

As best seen in FIGS. 1 to 3, the ring edge 36a at the front of wheel 10 overhangs the corresponding edge of rim 24 and is continuous all around the wheel. The opposite ring edge 36b also overhangs the corresponding opposite edge of rim 24. However, the ring edge 36b is interrupted by rectangular notches or recesses 38 for reasons to be discussed later. The lateral or axial extent of the ring 36 is such that its opposite edges 36a and 36b are usually flush with the opposite side walls of tire section 14. Consequently, in the finished wheel, those edges appear as side wall stripes on the sides of the tire section at the front and rear faces of the wheel 10. The stripes are particularly prominent when, as in the usual case, the rim and tire sections 12 and 14 are composed of different colored plastic materials. For example, if the rim section 12 is formed of white plastic and the tire section 14 is colored black, then the ring edges 36a and 36b will appear as white sidewall stripes against the black tire on the finished wheel as shown in FIGS. 1 and 2.

While there is a visible boundary between the tire section and rim section because of the different color plastic used to form the two sections, the two sections are mechanically linked together so it is virtually impossible to separate them without destroying them. The ring edges 36a and 36b appearing at the sides of the tire as decorative stripes are virtually indestructable since they extend right into the wheel. Abrasion of the stripes simply results in revealing the "fresh" like-colored stripe material.

By altering the edge profile of ring 36, one can create a variety of decorative effects on the side of the wheel, e.g. a circular array of dots, a wavy stripe, radially oriented stripes, etc. Likewise, another ring 36 may be added outboard of the first to form a wheel with concentric tire stripes.

On the other hand, if no stripes at all are desired, an insert can be placed in the rim section mold cavity to make ring 36 narrower so that it does not touch the tire mold during the formation of the tire section. In that event, the tire section plastic material is free to flow around the edges of the ring and thus conceals them.

Thus, forming a wheel out of two different plastic materials having different physical characteristics in a two-step molding process enables one to obtain at a relatively low cost a unitary plastic wheel having the "feel" and appearance of a conventional wheel fitted with a rubber tire. Therefore, the subject wheel can be incorporated into the more expensive strollers, carriages and other juvenile furniture items. Furthermore, the molding of the tire section of the wheel directly onto the rim section enables the wheel to be formed with a wide variety of decorative effects as discussed above.

It will thus be seen that the objects set forth above, among those made apparent from the preceding description, are efficiently attained, and, since certain changes may be made in carrying out the above method and in the article set forth without departing from the scope of the invention, it is intended that all matter contained in the above description and shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. An improved wheel comprising
   A. a discoid section (1) shaped to define a wheel rim, a wheel hub and connections between the rim and hub, and
(2) being composed of a first plastic material having selected physical characteristics, B. a generally toroidal tire section
(1) encircling the discoid section rim, and
(2) being composed of a second plastic material having at least one physical characteristic different from those of the first plastic material, and C. means mechanically connecting the tire section to the rim around the circumference of the discoid section, said connecting means including one or more portions
(1) extending appreciably radially beyond the outermost radial extent of said rim into said tire section, and
(2) extending axially to the outer surface of the tire section terminating flush therewith on at least one tire section sidewall at a location spaced radially outward from the periphery of said rim.

2. The wheel defined in claim 1 wherein the two sections differ in their elastomeric characteristic.

3. The wheel defined in claim 1 wherein the two sections differ in their color characteristic.

4. The wheel defined in claim 1 wherein said one or more portions includes a circular axially extending flange spaced radially out from the rim thereby defining a circular stripe on at least one tire section side wall.

5. The wheel defined in claim 4 wherein the plastic materials of the discoid and tire sections have different colors so that said one or more portions constitutes a tire section side wall decoration.

6. The wheel defined in claim 4 wherein said flange extends to the outer surfaces of the tire section on both sides of the wheel so as to define stripes on both the tire section side walls.

7. The wheel defined in claim 6 wherein at least one edge of the flange is formed with a circumferential array of recesses so that the stripe formed by the flange is interrupted on at least one tire section side wall.

8. An improved wheel comprising
A. a discoid section shaped to define a wheel rim, a wheel hub and connections between the rim and hub,
B. a toroidal tire section encircling the discoid section rim, and
C. plastic tire section sidewall decorating means
(1) projecting radially out from the discoid section rim appreciably beyond the outermost radial extent of said rim into the tire section,
(2) having axially extending portions spaced radially outboard of the rim periphery which terminate and define exposed surfaces at the outer surface of the tire section on at least one side of the tire section, and
(3) said decorating means and said tire section being colored differently so that said exposed surfaces of the decorating means appear as contrasting colored indicia at said surface of the tire section.

9. The wheel defined in claim 8 wherein said decorating means comprise
A. a generally flat ring spaced concentrically around said rim, and
B. means defining connections between said rim and said ring.

10. The wheel defined in claim 9 wherein said ring and connections are formed integrally with said discoid section.

11. The wheel defined in claim 10 wherein the opposite edges of said flat ring terminate at the outer surfaces of both tire section side walls so as to form circular side wall stripes at both sides of the tire section.

12. The wheel defined in claim 11 wherein at least one edge of said ring is formed with a circular array of recesses so that the circular side wall stripe formed by that edge is interrupted.

13. The wheel defined in claim 8 wherein
A. said tire section is black, and
B. said discoid section and said decorating means are colored differently from black.

* * * * *